Patented Sept. 13, 1932

1,876,883

UNITED STATES PATENT OFFICE

CHARLES EBERT, OF LEONIA, NEW JERSEY, WILLIAM B. NEWKIRK, OF RIVERSIDE, ILLINOIS, AND MEYER MOSKOWITZ, OF SPRING VALLEY, NEW YORK, ASSIGNORS TO INTERNATIONAL PATENTS DEVELOPMENT COMPANY, OF WILMINGTON, DELAWARE, A CORPORATION OF DELAWARE

MANUFACTURE OF DEXTROSE

No Drawing. Application filed April 1, 1927. Serial No. 180,332.

Our invention relates to the manufacture of dextrose, more particularly a high purity crystalline dextrose from starch, especially corn starch and has several objects in view: viz. increase in yield of dextrose by eliminating or rendering inactive or preventing the formation of certain substances which if present and active during conversion tend to change the dextrose produced by the hydrolysis of the starch into higher sugars, that is, sugars having a higher molecular weight, which are not only non-crystallizable themselves but tend to keep the dextrose in solution during the crystallizing operation; to decrease the equipment especially of crystallizers and centrifugals required for a given output of sugar; and to make it possible to manufacture directly and without recrystallization dextrose of the anhydrous type, the invention, in this respect providing an improvement upon the process of making anhydrous dextrose described and claimed in the co-pending application of said Newkirk, Serial No. 167,362 filed February 10, 1927 (Patent No. 1,693,118, Nov. 27, 1928).

Other incidental objects will be referred to in the following description of a preferred embodiment of the present invention. It will be understood, however, that the invention is not limited to all the details of the process to be described. As the process is susceptible of modification in many respects within the skill of those conversant with this industry, the description to follow will give what, according to our present information, is the most approved manner of practicing the process so as to obtain all of the benefits of the invention. With this understanding, the method which we recommend is as follows:

(a) A starch and water mixture having preferably a density of approximately 24° Baumé (although the density might be less) is converted with the customary amount of hydrolyzing acid (90 pounds of commercial 28% hydrochloric acid to 2500 gallons of starch liquor) under pressure, preferably 40 to 45 pounds per square inch, either in the usual copper autoclave or, which is preferable, in a glass enamel lined autoclave, to any desired dextrose content for example to a purity of from 40% to 42% dextrose, (on dry substance basis) calculated by the usual copper precipitation test. It is highly desirable to carry on this and the later conversions in a converter the inner surfaces of which are catalytically inert in the reactions which follow. We have discovered that the copper of the converter walls and the copper salts resulting from reaction between the hydrolyzing acid and the copper of the converter are especially active in catalyzing the dextrose to the higher sugars above referred to. The subsequent treatments, to be described, tend to remove these copper salts as well as other objectionable catalyzing agents but it is better, except as the cost of the enameled equipment may forbid, to make all of the conversions in vessels catalytically inert in the above sense.

(b) When conversion has reached the stage indicated the liquor is neutralized while still hot from the converter by sodium carbonate, or other suitable neutralizing agent according to the acid used in the conversion. This produces coagulation and precipitation of proteins, fats and colloidal impurities and a partial precipitation of mineral salts, the salts of iron or other heavy metals picked up during the manufacture of the starch and salts of copper if conversion has been conducted in copper converters. The neutralization is carried out sufficiently to give the liquor, preferably, a hydrogen ion concentration of $pH = 4.5°$ to $4.8°$, the higher pH being preferable.

(c) The neutralized liquor is then filtered mechanically to remove coagulated and precipitated impurities and is, preferably, also treated with an adsorption substance, for example, it may be filtered through bone char to remove residual metal compounds especially.

(d) The liquor is then again neutralized this time to give it a pH of from 5.5° to 6.5°. This is to complete the precipitation of the heavy metals. If neutralization were carried this far in the first stage the fats and some protein materials would be redispersed, that is, reduced again to a colloidal state or solution.

(e) This is followed by evaporation to a density of from 24° to 30° Baumé and bone char filtration at this density to remove the last traces of metallic compounds.

(f) The filtered liquid is diluted with water or sweet waters to a suitable density for conversion, preferably 19° to 20° Baumé and is reacidified to the extent of the first conversion and the conversion completed. If the removal of impurities has not been complete, adsorbent agents such as animal and vegetable carbons may be put into the converter.

The fully converted liquor is then, preferably, neutralized and filtered mechanically and over bone black. In this way a liquor can be obtained having a dextrose content of from 96% to 98% (dry substance basis). The dextrose may be crystallized from this solution in any desired manner either in crystallizers, after evaporation by reduction of temperature according to the methods of patents to Newkirk No. 1,471,347 dated October 23, 1923, and No. 1,521,830 dated January 6, 1925; or at a relatively constant temperature by maintenance of supersaturation through extraction of water. Since the present invention supplies a very high purity converted liquor it is one of the special advantages of the invention that the converted liquor may be "grained in the pan" to produce anhydrous sugar, without recrystallization, in accordance with the method disclosed in the pending application of said Newkirk, Serial No. 167,362 filed February 10, 1927. By this process the converted liquor concentrated in any suitable manner to a density of approximately 30° Baumé is introduced into a vacuum pan preferably with a small quantity of anhydrous seed crystals to induce crystallization added after the concentration has reached 40° to 42° Baumé (although seed crystals are unnecessary if the purity of the liquor is sufficiently high) and supersaturation is maintained by continuous extraction of water so as to "grain in the pan". The magma is then centrifuged to remove the mother liquor (hydrol) from the crystals which by washing will be found to have a purity between 99.5% and 100%. The hydrol may be reconverted in accordance with our copending application filed April 1, 1927, Serial No. 180,331, (Patent No. 1,673,187, June 12, 1928) either immediately or after having been reboiled to grain in the vacuum pan or concentrated and crystalized in a crystallizer and another batch of crystals extracted therefrom.

The high purity of the converted liquor obtained through operation of the first part of our present process appears to be the result of the removal between the stages of the two-stage conversion of certain substances, mineral salts, proteins, fats, or their reaction products, and other colloidal impurities in the liquor in the converter, which act as catalyzers to bring about the condensation of dextrose, as formed, to a higher molecular weight sugar or sugars which not only cannot be crystallized but tend to hold the dextrose in solution under conditions otherwise favorable to crystallization of the dextrose; and also the result of a control of conversion in the second stage thereof which prevents or checks the tendency of these catalyzing substances to form. One of the higher sugars formed by the ordinary methods of conversion when carried continuously to the solid sugar stage is gentiobiose, a disaccharide. It is quite likely that there are other such sugars formed by the action of the catalysts on the dextrose, having perhaps a more complex molecular structure. The catalysts which bring about the formation of these higher sugars are produced, apparently, during the conversion possibly by reaction of the hydrolyzing acid with the above named impurities or some of them. The removal of the catalyzers arrests the polymerization and, quite possibly, the continued application of heat with the hydrolyzing acid present and the other catalyzers removed tend to reverse the reaction and hydrolyze the higher sugars back to the monosaccharide.

Realizing that the method of our invention may be modified in some respects (certain modifications in fact having been suggested), we wish to be understood as desiring to cover by patent all variations within the scope of the appended claims.

We claim:

1. Method of manufacturing dextrose which comprises making a partial conversion of the starch, partially neutralizing the solution, filtering the same mechanically and over bone black, treating the solution with a neutralizing agent to increase the pH value, concentrating it, filtering at the higher density over bone black and then completing the conversion.

2. Method of manufacturing dextrose which comprises making a partial conversion of the starch, treating the solution with a neutralizing agent to give a hydrogen ion concentration of substantially pH=4.5° to 4.8°, filtering the same mechanically and over bone black, treating the solution with a neutralizing agent to give it a higher pH value, concentrating it, filtering at the higher density over bone black and then completing the conversion.

3. Method of manufacturing dextrose which comprises converting starch in two stages and between stages subjecting the solution to two treatments with neutralizing agents followed in each case by a filtering operation and over bone char with the solution at a higher density at the second filtration.

4. Method of manufacturing dextrose which comprises converting starch in two stages and between stages treating the solution twice with neutralizing agents, the second time to a higher pH value than the first time and after each such neutralizing treatment filtering the solution over bone char, the second time with the liquid at a higher density than at the first filtration.

5. Method of making dextrose from starch by hydrolysis which comprises partially converting the starch, removing from the solution at this intermediate stage in the conversion substances which catalyze dextrose to polysaccharides and completing the conversion in the presence of adsorption substances.

6. Method of making dextrose from starch by hydrolysis which comprises partially converting the starch, removing from the solution at this intermediate stage in the conversion substances which catalyze dextrose to polysaccharides and completing the conversion in the presence of adsorption substances and in a vessel the inner surfaces are catalytically inert in respect to the conversion reaction.

CHARLES EBERT.
WILLIAM B. NEWKIRK.
MEYER MOSKOWITZ.